April 27, 1965

J. R. FOSTER 3,180,392

TIRE BEAD BREAKING APPARATUS

Filed June 14, 1962

INVENTOR.
JAMES R. FOSTER

BY *Rudolph L. Lowell*

ATTORNEY

United States Patent Office 3,180,392
Patented Apr. 27, 1965

3,180,392
TIRE BEAD BREAKING APPARATUS
James R. Foster, Fort Dodge, Iowa, assignor to The Coats Company, Inc., Fort Dodge, Iowa, a corporation of Iowa
Filed June 14, 1962, Ser. No. 202,555
5 Claims. (Cl. 157—1.28)

This invention relates generally to wheelright apparatus and more particularly to improvements in vehicle pneumatic tire changing equipment such as that described in United States Letters Patent No. 3,008,512, issued to this inventor.

The primary object of this invention is to provide an improved bead breaking shoe for the bead breaking assembly of a wheelright apparatus having a great deal of flexibility of movement with regard to positioning of the shoe during a bead breaking operation.

A more specific object of this invention is to provide an improvement in vehicle tire bead breaking equipment wherein an upper shoe unit is carried by a bead breaker assembly in such a manner as to permit initial adjustment in the vertical plane relative to its mounting attachment with powered equipment in order to properly engage the bead of tires of various sizes prior to initiation of operation of the equipment.

A still further object of this invention is to provide an improvement in the upper shoe construction of a double bead breaking assembly in a tire changing apparatus wherein the shoe is adapted to movement in the horizontal plane to facilitate the placing of a vehicle wheel on the apparatus, and to movement in the vertical plane relative to its mounting bracket assembly to facilitate the placement of the shoe itself against the bead of tires of various diameters.

Another object of the invention is to provide a durable, simple, adjustable and economical upper shoe assembly for a bead breaking apparatus in tire changing equipment.

Figure 1:
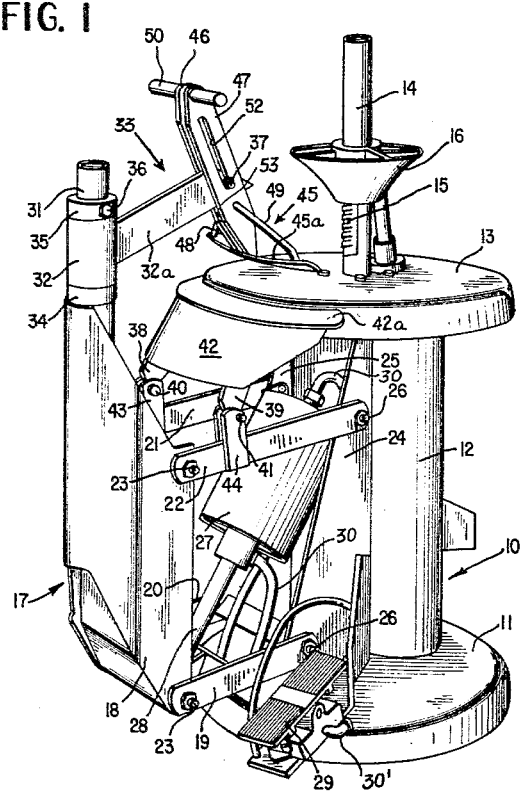
Figure 2:
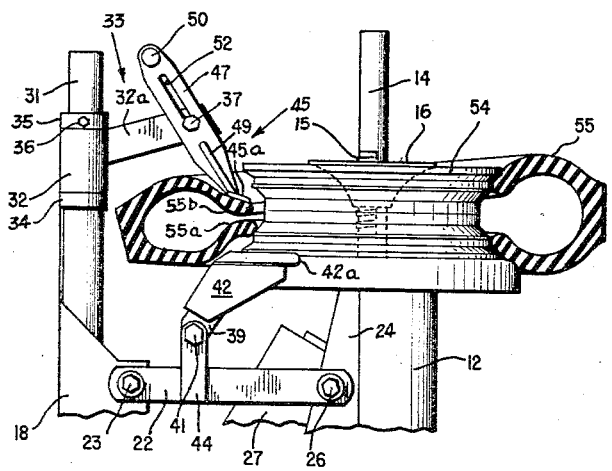
Figure 3:
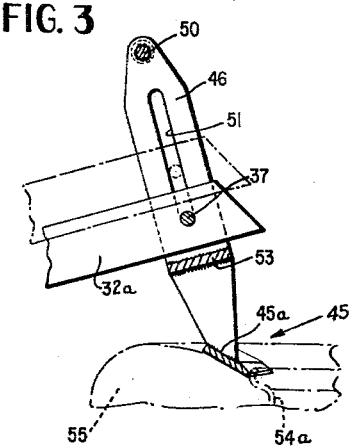
Figure 4:
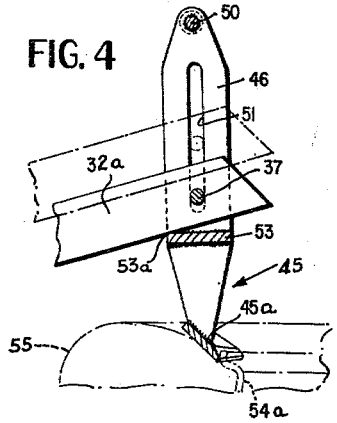
Figure 5:
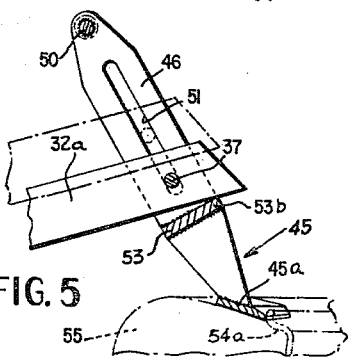

With the foregoing and other objects in view, the invention resides in the following specification and appended claims, certain embodiments and details of construction of which are illustrated in the accompanying drawings, in which:

FIGURE 1 is a view in elevation of a wheelright apparatus incorporating the invention;

FIGURE 2 is a fragmentary, partially sectioned view of a portion of the apparatus of FIGURE 1 with the upper shoe engaging a pneumatic tire in a bead breaking operation; and FIGURES 3, 4 and 5 are detail views illustrating in solid lines the upper shoe position relative to its supporting bracket during bead breaking operation on vehicle tires of various diameters, and in dotted lines the position of the shoe relative to the bracket just prior to operation.

Referring more particularly to the drawings, the wheelright apparatus of the present invention includes a mounting stand generally indicated by the reference character 10 as including a base 11, supporting framework 12 and a vehicle wheel receiving shelf 13. Secured to the framework 12 is an upwardly projecting post 14 including a threaded area 15 to receive a wheel holding or clamping cone 16 in the usual manner.

A bead breaker assembly generally indicated by the reference character 17 includes a frame member 18 connected as by pivot bolts 23 to one of the ends of parallel arms 19, 20, 21 and 22. The opposite ends of the arms 19, 20, 21 and 22 are secured to the members 24 and 25 of the frame 12 by suitable pivot bolt connections 26. Mounted within the area defined by the arms is a double acting fluid power cylinder 27 which is connected at one end in a pivotal manner to the pivot bolts 26 and which includes a power piston rod 28 pivotally connected by the pivots 23 to the frame 18 at the lower end thereof. Secured to the member 24 of the apparatus is a foot pedal control 29 which is connected by fluid lines 30 with the power cylinder 27 which has a fitting 30' for connection to a source of air under pressure. The arrangement as thus far described should be obvious to one skilled in the art. A depression of the foot pedal 29 in the appropriate manner, that is, by the toe or heel, will drive the power cylinder 27 to either extend or retract the piston rod 28, and in doing so, the linkage arrangement formed by the arms 19, 20, 21 and 22 will carry the bead breaker frame section 18 upwardly or downwardly.

Secured to the frame 18 by any suitable means such as welding is an upstanding post 31 about which is received a sleeve portion 32 of a bracket 33 which additionally includes a supporting arm 32a. The connection of the bracket 33 is such that it will swing freely in the horizontal plane about the vertical pivot axis formed by the post 31 within the sleeve portion 32. The sleeve portion is retained on the post 31 between a fixed lower ring 34 and a removable upper ring 35 which is secured to the post 31 as by means of a cap screw 36. Adjacent to the free terminal end of the arm 32a is a fixed transverse pivot pin 37 which is extended through the arm 32a so as to project from either side thereof.

A lower bead breaking unit 42 includes a shoe member 42a and a pair of arms 38 and 39 which are connected with the bead breaker assembly 17 by pivot pins 40 and 41, respectively, carried in support members 43 and 44 which are secured to arms 21 and 22 of the assembly 17. The lower shoe unit 42 is thus swingable in a vertical plane about the pivot pins 40 and 41.

As illustrated in FIGURE 1, an upper bead breaking shoe unit 45 includes a shoe member 45a of an arcuate shape connected as by welding to a pair of spaced parallel arms 46 and 47. The upper shoe 45a is further connected to the arms 46 and 47 by means of braces 48 and 49. Extending through the upper terminal end portions of the arms 46 and 47 is a gripping and bracing handle 50. Interconnecting the spaced arms at a position spaced slightly below the lower terminal portions of slots 51 and 52 formed in the arms 46 and 47, respectively, is an abutment 53 (FIGURE 3) which serves as a bearing surface for the bracket member 33 during a bead breaking operation. The pivot pin 37 is received in the slots 51 and 52 on either side of the arm 32a.

It is seen, therefore, that the construction of the upper shoe unit 45 and its connection with the bead breaker assembly 17 through the bracket 33 is such that provision is made to permit the horizontal swinging of the unit 45 about the post 31, and the pivoting of the shoe arms 46 and 47 about the pivot pin 37, as well as translatory movement in a vertical plane relative to the pivot 37 due to the slots 51 and 52.

In the use of the apparatus as thus far described, the upper shoe assembly 45 including the bracket 33 is swung in a horizontal plane away from the wheel supporting shelf or table 13. A vehicle wheel 54 having a rim 54a and a pneumatic tire 55 mounted thereon is placed over the post 14 in a supported position on the table 13. The clamping cone 16 is then affixed in position in the center hole section of the wheel 54 to rigidly secure the wheel to the table 13. The operator may then depress the foot pedal 29 to raise the bead breaker assembly 17 through the action of power cylinder 27 so that the shoe 42a will break the bottom bead 55a of the tire 55 from the wheel 54. Once the bottom bead is broken, the bracket 33 is swung to a position overlying the wheel 54 and the handle 50 is manipulated so as to translate and pivot the arms 46 and 47 to place the upper shoe 45a of the unit 45 into proper engagement with the upper tire bead 55b adjacent to the rim 54a of the vehicle wheel 54. The adjustability or flexibility of the connection between the arm 32a and the upper shoe assembly 45 is such as to accommodate wheels of various diameters. Thus, the slots 51 and 52 in arms 46 and 47 permit a wide variety of wheels of diverse diameters to be properly engaged by the upper bead shoe member 45a. In other words, the pivotal connection between the arms 46 and 47 and the arm 32a permits an angular movement of the upper shoe assembly 45 in the vertical plane whereby to properly position the upper shoe 45a against the upper bead of tires of wheels having different diameters.

Upon the proper positioning of the upper shoe 45a against the upper bead 55b of the tire 55, the foot pedal 29 is depressed in such a manner as to extend the piston rod 28, thereby forcing the bead breaker assembly 17 downwardly. Downward movement of the bead breaker assembly 17 lowers the bracket 33 to place the pin 37 into a bearing engagement with the bottom of slots 51 and 52 as in FIGURE 3 or with the abutment 53, as in FIGURES 4 and 5, whereby to place the upper bead 55b engaged by the shoe 45a under the direct action of the power cylinder 27 to break the bead 55b of the tire 55 away from the wheel rim 54a. This action is illustrated in FIGURES 3, 4 and 5 as applied to 14 inch, 15 inch or larger and 12 or 13 inch wheels respectively, and the shoe-bracket relationships in the initial and operative positions are shown in dotted and solid lines respectively.

In FIGURE 3 the shoe assembly 45a is illustrated as applied to a 14 inch wheel. When the shoe 45a is initially positioned at the junction of the rim 54a with the tire bead, the pin 37 is located intermediate the ends of the slots 51 and 52. On downward movement of the shoe assembly 17, the pin 37 moves downwardly into engagement with the lower ends of the slots 51 and 52, to apply a downward pressure on the shoe 45a concurrently with permitting movement of the shoe into the juncture of the bead and wheel rim. As shown in full lines, the arm 32a, in the breaking of the upper bead of a tire for a 14 inch wheel, does not engage the abutment 53 so that the downward pressure on the shoe 45a is applied directly to the arms 46 and 47 by the pivot 37.

When the upper bead of a tire for a 15 inch or larger wheel is to be broken, as illustrated in FIGURE 4, the pivot pin 37, similarly to the breaking of a bead for a 14 inch wheel, is located intermediate the ends of the slots 51 and 52 when the shoe 45a is initially positioned at the junction of the rim 54a with the upper bead of the tire. However on downward movement of the shoe assembly 17, the arm 32a engages the end 53a of the abutment 53 when the pivot pin 37 is spaced upwardly from the lower ends of the slots 50 and 51 whereby to hold the upper shoe assembly 45 in a position providing for the reception of the shoe 45a into the junction of the bead and rim as pressure is applied downwardly on the upper shoe unit 45. As shown in full lines in FIGURE 4 the downward pressure on the upper shoe 45a is thus applied to the arms 46 and 47 through the pin 37 and the abutment 53.

In FIGURE 5 the upper shoe unit 45 is illustrated for the breaking of upper beads for tires on 12 inch and 13 inch wheels. The shoe 45a is initially manipulated to its dotted line position, shown in FIGURE 5 so as to be at the junction of the rim and bead and on downward movement of the shoe assembly 17, the arm 32a is movable into engagement with the end 53b of the abutment 53, prior to the insertion of the shoe 45a within the junction of the rim and bead and downward movement of the shoe 45a against the tire bead to move the bead into the drop center portion of the rim 54. Thus similarly to the action of the shoe unit 45, as described in connection with FIGURE 4, a downward bead breaking pressure is applied to the arms 46 and 47 through the pin 37 and abutment 53.

Thus, as the assembly 17 moves downwardly, the upper shoe 45a closely bears against the contour of the wheel rim 54a until the bead 55b is broken away. If, upon breaking the bead, the remainder of the bead does not fall away from the rim, the assembly 17 is mounted on the framework 12 by means not shown, so as to be rotatable in the horizontal plane to move both the upper and lower shoe assemblies to a new position relative to the wheel, whereby the previously described operations to break both the upper and lower tire beads from a vehicle wheel 54 may be repeated.

While the apparatus as described and claimed is primarily directed to the disassembly or demounting of a pneumatic tire from a rimmed wheel, it is well known that the stand 10 is commonly used by the trade for remounting a tire on the rim after repair.

Variations of the details of the adjustable linkage for supporting the upper shoe are considered to be within the scope of this invention and the appended claims, and the specific arrangement illustrated and claimed may be modified by one skilled in the art and fall within the concepts of the invention.

I claim:

1. A vehicle tire demounting apparatus comprising a supporting stand, means to support a rimmed vehicle wheel with a pneumatic tire thereon in a fixed position upon the stand, a bead breaker assembly pivotally mounted upon the stand for movement in both horizontal and upright planes, a tire bead engaging shoe positioned generally above a wheel supported upon the stand, and a bracket pivotally secured at one end to the assembly about a vertical pivot axis, said bracket at the free end having secured thereto a transverse pivot pin, said shoe including a slotted area to receive said pivot pin, whereby the shoe is capable of pivotal and translatory movement in the upright plane relative to the bracket.

2. A vehicle tire demounting apparatus comprising a supporting stand, means to support a rimmed vehicle wheel with a pneumatic tire thereon in a fixed position upon the stand, a bead breaker assembly pivotally mounted upon the stand for movement in both horizontal and upright planes, a tire bead engaging shoe positioned generally above a wheel supported upon the stand, said shoe including a pair of spaced arms with opposed slots, and a bracket pivotally secured at one end to the assembly about a vertical pivot axis, said bracket at the free end having secured thereto, and projecting from either side thereof, a pivot pin, said free end of the bracket being received between the spaced arms of the shoe and said pivot pin being received in the slots of the arms, whereby the shoe is capable of pivotal and translatory movement relative to the bracket.

3. A vehicle tire demounting apparatus comprising a supporting stand, means to support a rimmed vehicle wheel with a pneumatic tire thereon in a fixed position upon the stand for movement in both horizontal and upright planes, a tire bead engaging shoe positioned generally above a wheel supported upon the stand, said shoe including a pair of spaced arms with opposed slots, and a bracket pivotally secured at one end to the assembly about a vertical pivot axis, said bracket at the free end having secured thereto, and projecting from either side thereof a pivot pin, said shoe including an abutment interconnecting the arms at a point spaced from the lower ends of the slots, said free end of the bracket being received between the spaced arms of the shoe and said pivot pin being received in the slots of the arms, whereby the shoe is capable of pivotal and translatory movement in the upright plane relative to the bracket, and whereby the abutment and/or the pin may serve as bearing surfaces for the bracket during a bead breaking operation on tires mounted on wheels of various diameters.

4. A vehicle tire demounting apparatus comprising a supporting stand, means to support a rimmed vehicle wheel with a pneumatic tire thereon in a fixed position upon the stand, a bead breaker assembly pivotally mounted upon the stand for movement in both horizontal and upright planes, a tire bead engaging shoe positioned generally above a wheel supported upon the stand, a horizontally swinging bracket for connecting the shoe to the bead breaker assembly, said shoe including a tire bead engaging portion comprising a generally planar portion and a bracket attaching portion including a pair of spaced, similarly slotted arms, said shoe being further provided with an abutment connected between the spaced arms in the area between the lower end of the slots and the planar portion of the shoe, and bracket mounted pivot means engaging the slots of the spaced arms to provide both pivotal and translatory movement of the shoe in the upright plane relative to the bracket, said abutment and/or pivot means serving as a bearing means for the bracket during a bead breaking operation on a tire.

5. A vehicle tire demounting apparatus comprising a supporting stand, means to support a rimmed wheel with a pneumatic tire thereon in a fixed position on the stand, a bead breaker assembly mounted on the stand for movement relative thereto, means for moving said bead breaker assembly, a bracket member mounted on said bead breaker assembly for movement therewith and extending generally over the wheel supported on the stand, a bead breaker shoe member mounted on said bracket member in a position to engage a tire side wall, means forming a lost motion connection between said shoe member and bracket member including a generally transverse pin in one of the members and a longitudinal slot in the other of the members embracing said pin, said connection establishing relative pivotal and linear movement between the shoe member and the bracket member so that the shoe member may be properly positioned against a tire bead, and means limiting the relative lost motion between the bracket member and the shoe member so that the movement of the assembly and the bracket member may force the shoe member against the tire bead.

References Cited by the Examiner

UNITED STATES PATENTS

| | | | |
|---|---|---|---|
| 1,646,511 | 10/27 | Weaver et al. | 157—1.26 |
| 3,032,095 | 5/62 | Brosene et al. | 157—1.28 |

FRANK E. BAILEY, *Primary Examiner.*